United States Patent

[11] 3,568,696

| | | | |
|---|---|---|---|
| [72] | Inventor | Seitoku Kubo | |
| | | Aichi-ken, Japan | |
| [21] | Appl. No. | 806,262 | |
| [22] | Filed | Mar. 11, 1969 | |
| [45] | Patented | Mar. 9, 1971 | |
| [73] | Assignee | Toyota Jidosha Kogyo Kabushiki Kaisha | |
| | | Aichi-ken, Japan | |
| [32] | Priority | Mar. 13, 1968 | |
| [33] | | Japan | |
| [31] | | 43/16695 | |

[54] GOVERNOR CONTROL FOR AUTOMATIC TRANSMISSION
2 Claims, 4 Drawing Figs.

[52] U.S. Cl. .................................................. 137/54, 74/752
[51] Int. Cl. ........................................ G05d 13/10, F16h 5/42
[50] Field of Search ......................................... 74/752, 867, 868, 869; 137/54, 56

[56] References Cited
UNITED STATES PATENTS

| | | | | |
|---|---|---|---|---|
| 2,740,303 | 4/1956 | Bock et al. .................... | 74/869X | |
| 3,139,102 | 6/1964 | Powell .......................... | 137/54 | |
| 3,322,133 | 5/1967 | Searles ......................... | 137/56 | |
| 3,431,928 | 3/1969 | Pierce, Jr. .................... | 137/54 | |
| 3,446,098 | 5/1969 | Searles ......................... | 74/869 | |
| 3,453,908 | 7/1969 | Iijima ........................... | 74/867 | |

*Primary Examiner*—Carlton R. Croyle
*Assistant Examiner*—Thomas C. Perry
*Attorney*—George B. Oujevolk ABSTRACT: A governor assembly for the control system of an automatic transmission is composed of two governors, a primary governor and a secondary governor, each mounted on the output shaft of the transmission in a symmetrical arrangement with respect to the axis of the output shaft. Modulator pressure produced by the primary governor is applied to the secondary governor, by which governor pressure as a pressure signal for actuating shift valves for controlling the transmission is established. The modulator pressure is obtained from line pressure and is related to the output shaft speed by controlling communication with the line pressure in accordance with centrifugal force applied to the movable valve member of the primary governor. The governor pressure of the secondary governor is obtained from the modulator pressure and is related to the output shaft speed in a similar manner to the primary governor. The resulting governor pressure rises rapidly at low speeds and slowly at higher speeds.

GOVERNOR CONTROL FOR AUTOMATIC TRANSMISSION

SUMMARY OF THE INVENTION

The present invention relates to automatic transmissions for motor vehicles, and more particularly to a governor control for such transmissions.

An object of the invention is to provide a compound governor capable of providing a proper governor pressure for controlling the shift valve system of an automatic transmission which depends upon the rotational speed of the transmission output shaft thereby enabling the transmission to effect an ideal speed change.

Another object of the invention is to provide a compound governor assembly of compact construction without need of a large weight. A further object of the invention is to provide a compound governor the characteristic curve of which can be easily translated.

Other objects and advantages of the invention will be apparent from the following description, taken in connection with the accompanying drawings.

DESCRIPTION OF A PREFERRED EMBODIMENT

Figure 1:
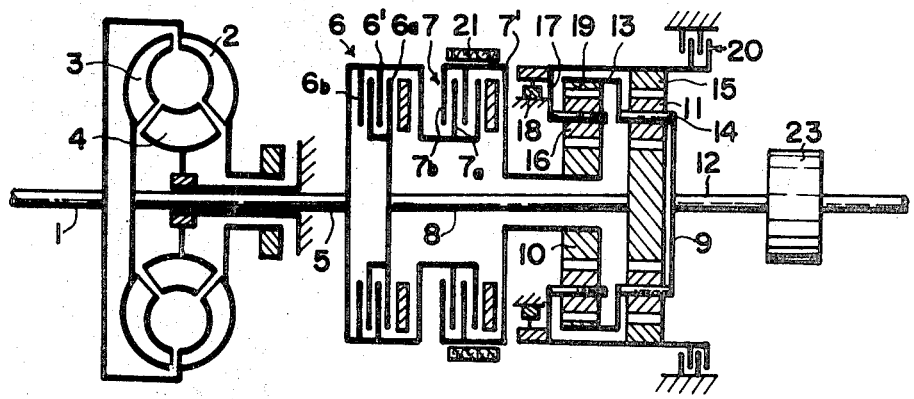
FIG. 1 is a schematic diagram of a power transmission mechanism capable of being used with a compound governor according to the invention.

The mechanism of an example of automatic transmissions having a planetary gear system of forward three speeds is shown in FIG. 1. There is provided a torque converter composed of a pump impeller 2 directly connected to an input shaft 1 driven by an engine, a turbine runner 3 rotated by oil which is forced to flow by the pump impeller and a stator 4 to change the direction of oil flow from the turbine runner. The turbine runner 3 is connected to the input shaft 5 of the transmission gear. A front clutch 6 consists of an internally splined clutch drum 6' fixed on the input shaft 5, clutch plates 6b splined to the clutch drum 6' and clutch discs 6a splined to the intermediate shaft 8 of the transmission. The clutch discs 6a and the clutch plates 6b are brought into frictional engagement by fluid pressure thereby establishing a driving connection between the shafts 5 and 8. Similarly, a rear clutch 7 consists of an internally splined clutch drum 7' connected to a front sun gear 10 of a planetary gear system, clutch plates 7b outwardly splined to the clutch drum 7 and clutch discs 7a splined to another portion of the front clutch drum 6'. Frictional engagement of the rear clutch 7 establishes a driving connection between the input shaft 5 and the front sun gear 10.

The intermediate shaft 8 is incorporated with a rear sun gear 9 of the planetary gear system. The rear sun gear 9 meshes with rear pinions 11 which mesh with a rear ring gear 15. The rear carrier 13 which carries the rear pinions 11 is incorporated with the output shaft 12 and a front ring gear 19. The front ring gear 19 meshes with front pinions 16 which mesh with the front sun gear 10. A front gear carrier 17 which carries the front pinions 16 is incorporated with the rear ring gear 15, around which is provided a low and reverse clutch 20 (or an equivalent brake unit). Similarly, around the rear clutch drum 7' there is provided a front brake band 21. Further, the rear ring gear 15 includes an overrunning clutch 18 which performs the function similar to the low and reverse clutch 20 in the first speed condition.

In the above transmission, the first speed is established by applying the front clutch 6 and the low and reverse clutch 20. However, when a driving power is supplied from the engine side, the overrunning clutch 18 operates without applying the low and reverse clutch 20 so that the same result may be obtained. To establish the second speed, the low and reverse clutch 20 is released, and the front band 21 is applied while the front clutch 6 remains applied. The third speed is established by applying both the front clutch 6 and the rear clutch 7. The reverse speed is established by applying both the rear clutch 7 and the low and reverse clutch 20.

In order to obtain different forward speed ratios in such an automatic transmission, it is necessary to provide a suitable shift valve system for selectively applying hydraulic pressures to the servounits of the three clutches and the brake band. Such a shift valve system is controlled by the throttle pressure pertaining to the opening of a carburetor throttle valve or the negative pressure in an intake manifold and the governor pressure pertaining to the rotational speed of the output shaft (or the vehicle speed).

A compound governor assembly 23 which may change a control signal for the shift valve system in dependence upon the rotational speed of the output shaft in an ideal manner will now be described.

Figure 3:
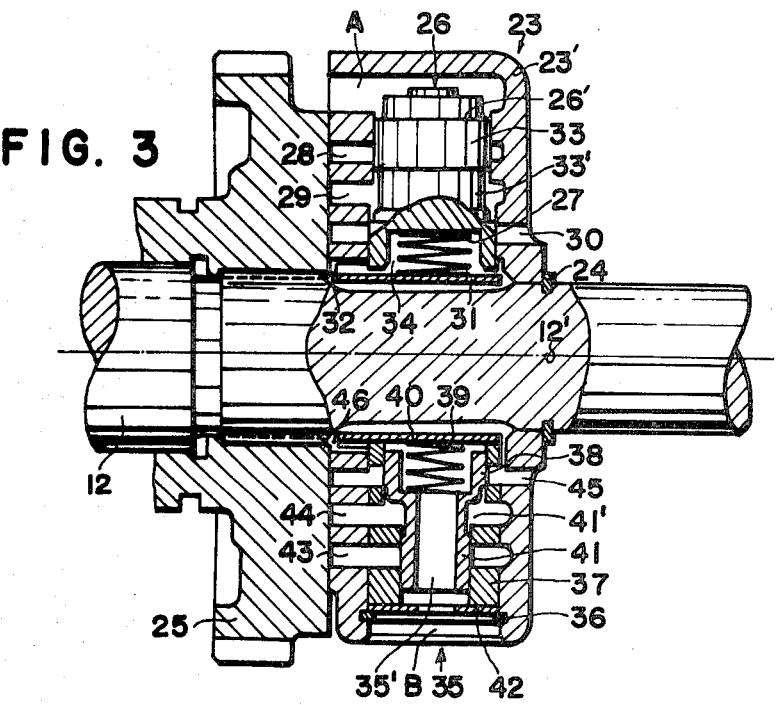
FIG. 3 is a longitudinal sectional view of the compound governor assembly.

As shown in FIG. 3 the compound governor assembly 23 is bolted to a governor support 25 which is in turn fixed concentrically on the output shaft 12, and is restrained from axial movement by means of a snap ring 24. A governor body 23' is formed with radial valve bores disposed symmetrically with respect to the axis 12' of the output shaft 12, line 12'. A primary governor 26, which is inserted in one of the stepped of the bores, consists of a valve element 26' having a land 34 and a land 33 with a smaller diameter than the land 34, a spring 27 urging this valve element 26' radially outwardly and a seat 31 for the spring 27. On the other hand, a sleeve 37 having a stepped inside is inserted in the other bore and, is held in place in the valve body by means of a spring seat 40, a plate 42, and a retaining member 36. A secondary governor 35 is received in this sleeve 37. The secondary governor 35 is composed of a valve element 35' having a land 38 and a land 41 with a smaller diameter than the land 38, a spring 39 urging the valve element 35' radially outwardly and a spring seat 40. A plate 42 serves to restrict the outward movement of the valve 35' element.

When the vehicle remains stopped, the valve element 26' is urged to the uppermost position by the spring 27 so that communication between a valve chamber port 28 for line pressure and a valve chamber port 29 for modulator pressure is established through an annular slot 33' of the valve element 26'.

Here, assuming:

$A_1$ : a cross-sectional area of the land 33;
$A_2$ : a cross-sectional area of the land 34;
$W_1$ : a force of spring 27; and
$F_1$ : a resulting centrifugal force applied to the valve element 26', the spring 27 and the spring seat 31 (this is a function of $n^2$, where $n$ is a rotational speed of output shaft 12);

then a radially inward force due to a difference of in the area between the lands 33 and 34 is applied to the valve element 26'. The hydraulic pressure $P_{MO}$ (modulator pressure) thus built up in the port 29 will be $$P_{MO} = \frac{W_1}{A_2 - A_1} \qquad (1)$$

Next, when the vehicle starts to run and subjects the valve element 26', the spring 27, and the spring seat 31 to centrifugal force, the modulator pressure $P_{MO}$ will be $$P_{MO} = \frac{1}{A_2 - A_1}(F_1 + W_1) \qquad (2)$$

Figure 4:
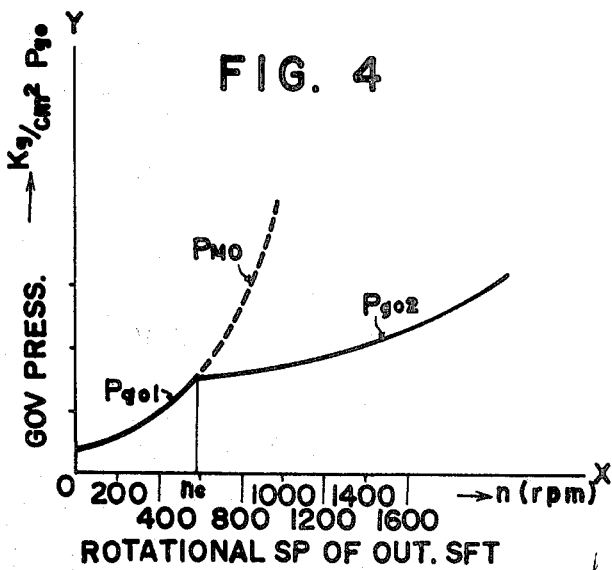
FIG. 4 is a graph showing the relationship between governor pressure and the transmission output shaft speed.

Thus, the valve elements 26' tends to control the communication between the valve chamber port 28 of line pressure and the valve chamber port 29 of modulator pressure so that modulator pressure which is lower than the line pressure can be produced in accordance with the speed of the output shaft 12, FIG. 4 illustrates the curve of $P_{MO}$ according to the equation (2).

Figure 2:
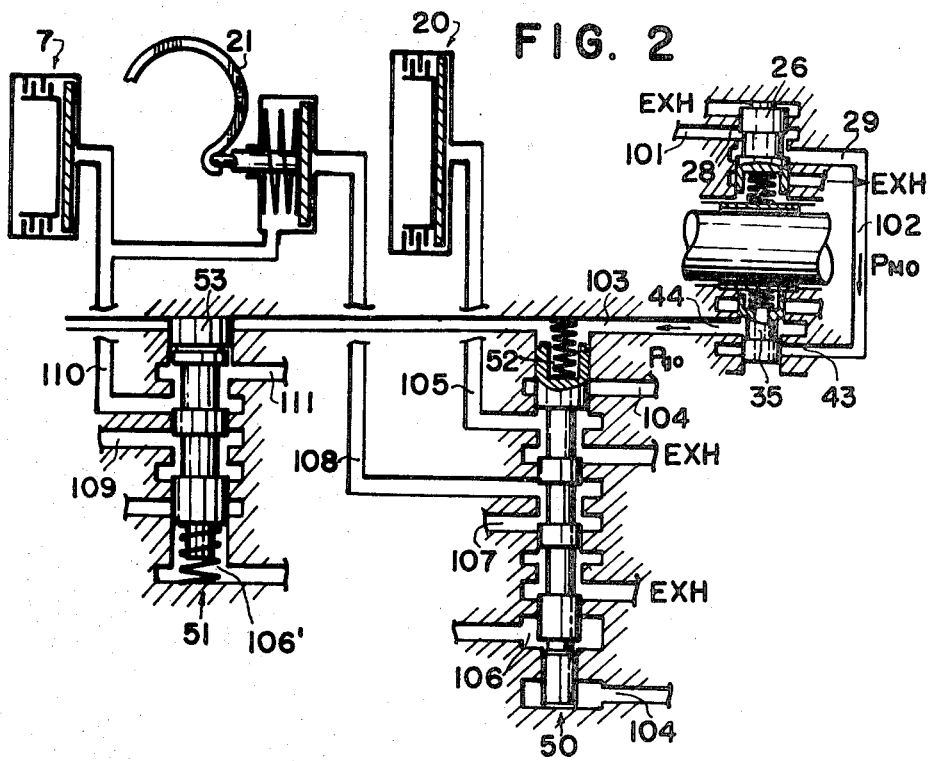
FIG. 2 is a schematic diagram of a fluid pressure control system of the transmission in FIG. 1.

The modulator pressure $P_{MO}$ communicates to a valve chamber port 43 of the secondary governor 35 through a modulator pressure passage 102 formed in the governor body 23' (see FIG. 2).

Assuming:
$A_3$: a cross-sectional area of the land 41;
$A_4$: a cross-sectional area of the land 38;
$W_2$: a force of the spring 39; and
$F_2$: a resulting centrifugal force applied to the valve element 35' and the spring 39 (this is a function of $n^2$);
the sum of the centrifugal force $F_2$ and the spring force $W_2$ overcomes a radially inward force due to the difference in the area between the lands 41 and 38, and urges the valve element 35' outwardly against the plate 42, until the speed of the output shaft 12 exceeds $nc$ in FIG. 4. In other words, when $n < nc$, $(A_4 - A_3) P_{MO} < F_2 + W_2$.

In this speed range, the valve chamber port 43 for modulator pressure remains in communication with a valve chamber port 44 for governor pressure through an annular slot 41' of the valve element 35' so that the governor pressure Pgo becomes equal to $P_{MO}$. The governor pressure having a rapid rise in this range is called the first phase governor pressure $P_{go1}$.

When the vehicles speed increases, that is, $n > nc$ the modulator pressure developing in the valve chamber port 43 increases to urge the valve 35' radially inwardly thereby establishing communication between the valve chamber port 44 and an exhaust port 45 so that governor pressure, which is balanced with the sum of the spring force and the centrifugal force can be produced. The governor pressure $$P_{go} = \frac{1}{A_4 - A_5}(F_2 + W_2) \quad (3)$$

under this condition there is a second phase governor pressure $P_{go2}$. As shown in FIG. 4, the second phase governor pressure $P_{go2}$ with increase in the speed of the output shaft 12 rises more slowly than the first phase governor pressure $P_{go1}$. The valve element 35' thus controls the communication between the valve chamber port 43 of modulator pressure and the valve chamber port 44 of governor pressure to produce the governor pressure in accordance with the speed of output shaft.

As explained above, the governor assembly according to the present invention can provide two different governor characteristics in accordance with increase in the speed of the output shaft.

FIG. 2 illustrates a hydraulic control system of the transmission equipped with the above governor assembly. The governor pressure from the valve chamber 44 passing a pressure line 103 is applied to a land 52 of a 1—2 shift valve 50 and a land 53 of a 2—3 shift valve 51, respectively. When the throttle valve is opened relatively large at a low speed, the 1—2 shift valve is moved upwardly by the throttle pressure to communicate a front servopressure line 108 to an exhaust port thereby releasing a front servounit. At the same time the overrunning clutch 18 provided on the rear ring gear 15 is applied to establish the first speed. When the governor pressure with increase in the vehicle speed rises higher, the 1—2 shift valve is moved downwardly so that a line pressure circuit 107 communicates with the front servopressure line 108 to apply the brake band 21 thereby establishing the second speed. The 1—2 shift in accordance with the opening of the throttle valve is effected up to the speed of about 45 km/h. The governor pressure is also applied to the 2—3 shift valve 51, the movement of which is resisted by throttle pressure applied to the valve chamber port 106' as in the 1—2 shift valve 50. When the governor pressure with a further increase of the vehicle speed rises sufficiently to enable the 2—3 shift valve to move downwardly, a line pressure circuit 109 communicates with a rear clutch pressure line 110 to release the front servo and to apply the rear clutch 7 so that the 2—3 shift may be effected. This 2—3 gear shifting in accordance with the opening of the throttle valve is effected in the speed range from 16 to 90 km/h.

The governor pressure plays an important role as a pressure signal for the shift valve control system. The desirable variation of this governor pressure is such that the governor pressure rises rapidly for the 1—2 shift at low speeds while it rises slowly for the 2—3 shift in a relatively wide range of speed variation from low speeds to intermediate speeds.

The governor pressure control system according to the present invention, as explained above operates in accordance with the first phase governor pressure equal to the modulator pressure produced by the primary governor in the low speed range and in accordance with the second phase governor pressure controlled by the secondary governor in a wide speed range in which the 2—3 gear shift is mainly carried out. The variation of governor pressure in the first phase and the second phase thus may be made independently of each other by the separate governors so that both governor characteristic curves can be modified so as to meet an optimum speed change condition. Moreover, by suitably selecting the spring constant of the spring in the primary governor, the pressure curve in the first phase can be translated vertically so that a heavy weight is not required for increasing the governor pressure at the low speed side. This enables the valve to make contact. Consequently, any modification of the shift valve system for correcting of the governor pressure as in conventional governors is not required more. The equipment thus can be minimized and also simplified in construction.

While the form of apparatus herein described constitutes a preferred embodiment of the invention, it is to be understood that the invention is not limited to this precise form of apparatus, and that changes may be made therein without departing from the scope of the invention.

I claim:

1. A dual governor mounted on an output shaft 12 for controlling a fluid transmission system by generating oil pressure in response to a centrifugal force, comprising in combination:
   a. first and second governors 26, 35 mounted on said shaft and extending radially outwards therefrom, said first governor generating a modular pressure in response to an output shaft speed;
   b. first and second spring biased valves 26' 35' in said governors having defined land portions thereon of different areas for radial movement therein corresponding to the centrifugal force created by the rotational speed of said shaft 12 said first valve being biased radially outwards;
   c. a governor body 23' around said first and second governors 26, 35 including at least one set of input and output ports 28, 29 and an exhaust port for said first governor, the relative position of said first valve 25' land portions controlling said modular pressure, at least outer, inner and central ports 43, 44, 45 for said second governor;
   d. a modulator line 102 from said first governor output port 29 to said second governor outer port 43 an output line 103 connected to said center port 44 while said inner port 45 serving as an exhaust port, the relative position of said second valve 35' land portions controlling the modular pressure through said second governor 35 and out of said output line 103 and said exhaust port 45, the position of said second valve land portions depending on the spring bias and the modulator line pressure, said second governor regulating the modulator pressure in response to a centrifugal force and further generating modulated governor pressure; and,
   e. transmission control means responsive to said output line 103, whereby a two phase governor control is established.

2. A dual governor as claimed in claim 1 wherein the spring constant of at least one of the spring biased valves is so selected that the output controlled by said valve will be in accordance with a preselected pattern.